United States Patent [19]

Taylor

[11] 4,344,718

[45] Aug. 17, 1982

[54] COLD WEATHER COUPLING DEVICE

[75] Inventor: Kenneth R. Taylor, Richardson, Tex.

[73] Assignee: Atlantic Richfield Company, Los Angeles, Calif.

[21] Appl. No.: 317,215

[22] Filed: Nov. 2, 1981

[51] Int. Cl.³ .............................................. F16D 1/02
[52] U.S. Cl. .................................. 403/287; 403/339; 403/292; 403/286
[58] Field of Search ............... 403/341, 339, 340, 293, 403/286, 292, 287

[56] References Cited

U.S. PATENT DOCUMENTS

| 415,759 | 11/1889 | Willis | 403/341 X |
| 617,536 | 1/1899 | Martin | 403/339 X |
| 904,603 | 11/1908 | Crocker | 403/340 |

FOREIGN PATENT DOCUMENTS 1529556  5/1968  France ................................ 403/292

*Primary Examiner*—Andrew V. Kundrat
*Attorney, Agent, or Firm*—Roderick W. MacDonald

[57] ABSTRACT

A quick coupling device for use in cold environments such as the Arctic to joint two shafts in an end-to-end relation which comprises a first hollow cylindrical body on one shaft end which has a cut out portion and carries a hollow, internally threaded stud opposite the cut out portion, and a second hollow cylindrical body carried by the other shaft end which has a corresponding cut out portion so that the first and second bodies can be mated together to form a continuous cylindrical body from one shaft end to the other shaft end, the second cylindrical body having a plate across the cut out portion with an aperture therein which aperture registers with the open end of the stud means when the first and second cylindrical bodies are mated whereby a threaded pin means can then be screwed into the stud means from outside the first cylindrical body and said pin means will extend through said stud means and into the plate aperture to physically join the first and second cylindrical bodies and, therefore, the two shafts ends to one another.

3 Claims, 6 Drawing Figures

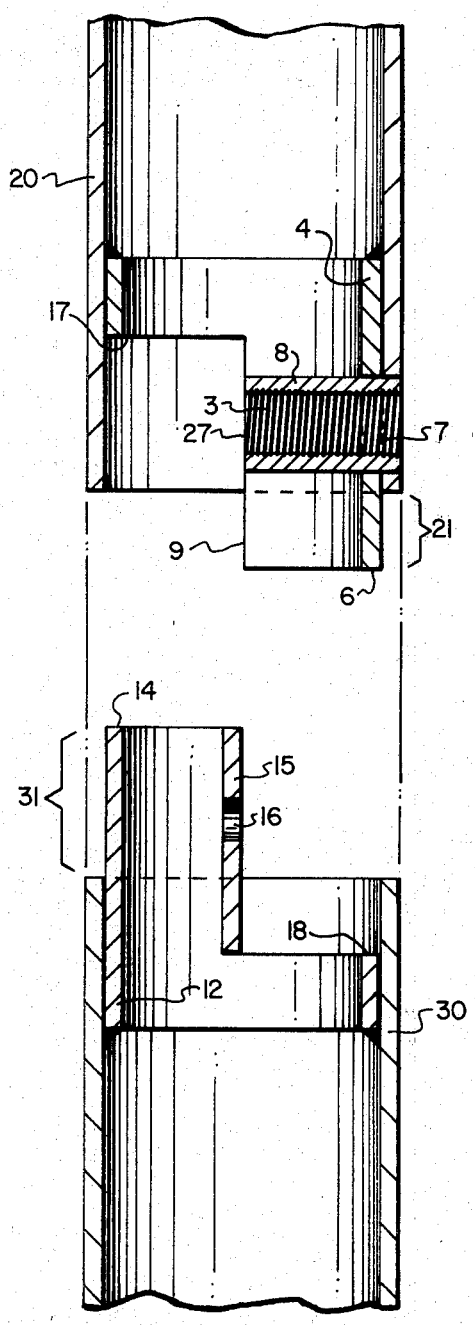
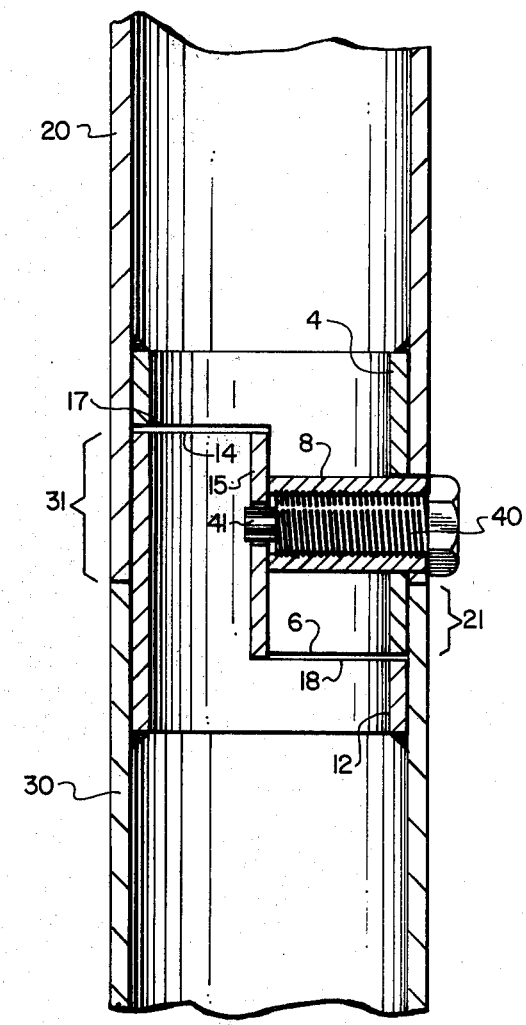
FIG. 5
FIG. 6

COLD WEATHER COUPLING DEVICE

BACKGROUND OF THE INVENTION

Heretofore, quick coupling devices for joining two shafts in an end-to-end relation have employed spring-loaded devices and pins which work well in normal environmental conditions. However, more and more mineral exploration and well drilling and production operations are carried out in extremely cold, arctic-type conditions which require not only quick coupling devices which are not subject to freeze-up, as are the prior spring-loaded devices, but which also can be readily assembled by an operator without having to remove protective mittens or gloves.

SUMMARY OF THE INVENTION

In accordance with this invention there is provided a cold weather quick coupling device which is not as susceptible to freeze-up and which can be readily assembled even with mittens on.

The coupling device of this invention is comprised of two parts, each part designed to be carried by opposing shaft ends. A first part of the device comprises a first hollow cylindrical body having an arcuate cut out portion removed from the outer end of the body and carrying a hollow, internally threaded stud means which is open at both ends and fixed at one end in the interior of the body opposite the cut out portion of that body. The second part is carried by the opposing shaft end and comprises a second hollow cylindrical body having an arcuate cut out portion so that the first and second bodies fit together to provide a single, continuous, cylindrical body extending from one shaft end to the other shaft end. The second body has an apertured plate means across its cut out portion, the plate aperture being positioned so that when the first and second cylindrical bodies are mated together, the plate aperture registers with the open interior end of the stud means. This way, when the first and second bodies are mated, a threaded pin means can be screwed from outside the second body into the stud means, out the interior end of the stud means, and into the plate aperture thereby physically joining the first and second cylindrical bodies and, therefore, the opposing shaft ends, to one another.

Accordingly, it is an object of this invention to provide a new and improved quick coupling device for reliable use in extremely cold climates.

Other aspects, objects and advantages of this invention will be apparent to those skilled in the art from this disclosure and the appended claims.

BRIEF DESCRIPTION OF THE DRAWINGS

FIG. 5 shows the assemblies of FIGS. 3 and 4 just prior to mating of the coupling device halves.

FIG. 6 shows the assemblies of FIG. 5 when joined and physically fixed to one another by way of a threaded pin means.

DETAILED DESCRIPTION OF THE INVENTION

Figure 1:
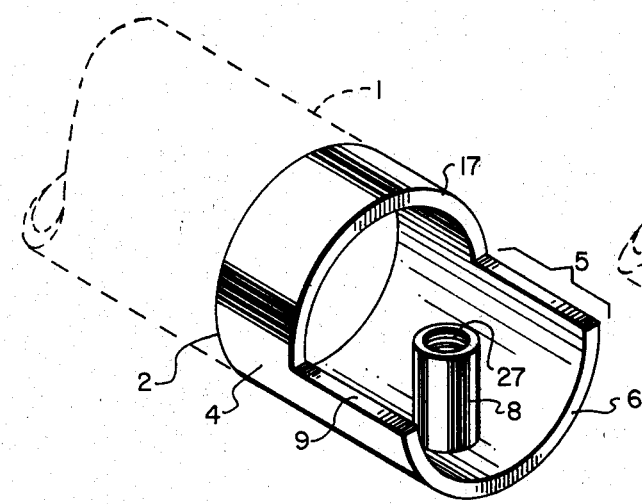
FIG. 1 shows an isometric drawing of the studded part of the coupling device of this invention when fixed to the end of a solid shaft.

FIG. 1 shows shaft 1 which is joined at one longitudinal end thereof by way of weld bead 2 to one half of the coupling means of this invention. First shaft 1 carries first coupling means on the shaft's outer end so that the coupling means is a longitudinal extension of said shaft. First coupling means comprises a first hollow cylindrical body 4 having an arcuate portion 5 cut out of said body 4 along a portion of the longitudinal length of body 4 from the outer end edge 6 of said body 4. Outer end 6 is the end of body 4 which is furthest removed from shaft 1. Body 4 has an aperture 7 (FIG. 5) therein in the area of, and opposite to, cut out 5. A hollow, internally threaded stud means 8 is fixed to body 4 with the internal, longitudinal hole 3 (FIG. 5) through stud means 8 in registry with aperture 7. Stud means 8 extends into the interior of body 4 up to cut out edge 9.

Figure 2:
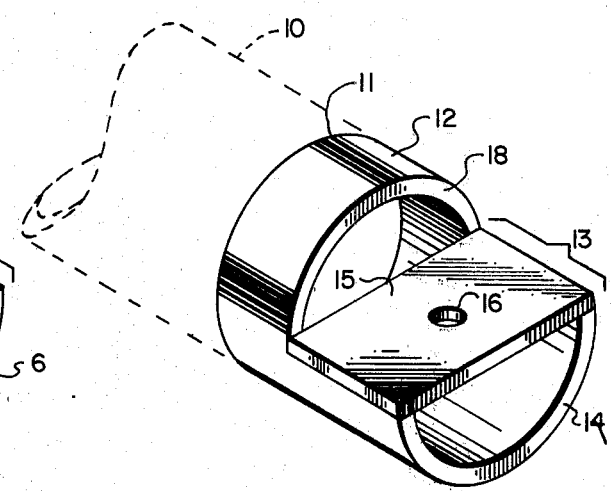
FIG. 2 shows an isometric view of the apertured plate part of the coupling device of this invention when fixed to the end of another solid shaft.

FIG. 2 shows second shaft 10 having welded thereto at 11 a second hollow cylindrical body 12 which also has an arcuate cut out portion 13 removed from part but not all of the length of body 12 from the outer end edge 14 of body 12. Body 12, like body 4, is carried wholly externally of shaft 10 as a longitudinal extension thereof.

Cut out portion 13 of body 12 is sized so as to mate with cut out portion 5 of body 4, as better shown in FIGS. 5 and 6, so that when the two bodies are fitted together as shown in FIG. 6, they provide a single, continuous, cylindrical body extending between opposing ends of shafts 1 and 10. A plate means 15 extends across cut out portion 13 of body 12 and has an aperture 16 therein. Aperture 16 is located in plate 15 so that when bodies 12 and 4 are fitted together, aperture 16 corresponds or registers with the internal opening 27 of stud 8. When so fitted together, outer end 14 of body 12 abuts edge 17 of body 4 while outer edge 6 of body 4 abuts edge 18 of body 12, as better shown in FIG. 6.

Figure 3:
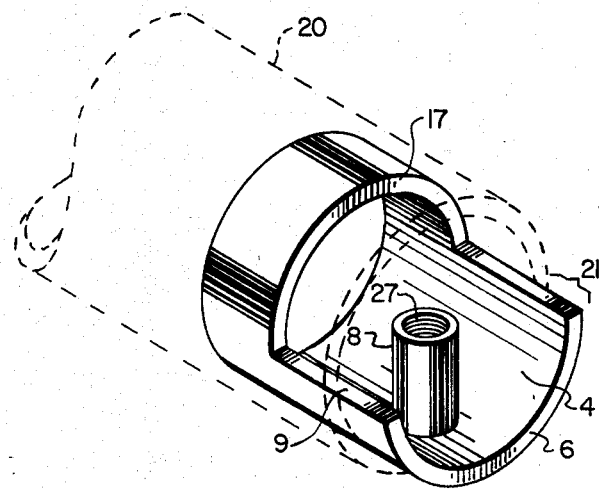
FIG. 3 shows the studded part of the coupling device of this invention when mounted in the interior of a hollow shaft.

FIG. 3 shows the coupling means of FIG. 1 mounted part way into the interior of hollow cylindrical shaft 20 rather than on the end of solid shaft 1. Shaft 20 is shown in dotted lines in FIG. 3 for ease of clarity. As can be seen from FIG. 3, portion 21 of body 4 extends out of the open end of shaft 20 with the remainder of body 4 being set into the interior end of shaft 20. This can be better seen in FIG. 5.

Figure 4:
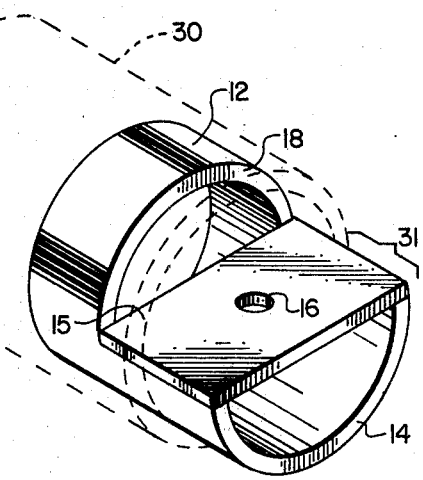
FIG. 4 shows the apertured plate part of the coupling device when mounted in the interior of a hollow shaft.

Similarly, FIG. 4 shows the coupling means of FIG. 2 mounted inside one end of another hollow cylindrical shaft 30 with portion 31 of body 12 extending out the open end of shaft 30 with the remainder of body 12 being disposed interiorally of shaft 30.

FIG. 5 shows the two coupling assemblies of FIGS. 3 and 4 as they approach one another when being fitted together so that it can be seen how the cut out portions 5 and 13 of bodies 4 and 12, respectively, fit together to provide a single continuous cylindrical body extending between shafts 20 and 30 (FIG. 6).

As shown in FIG. 5, edge 14 of body 12 approaches edge 17 of body 4, while edge 6 of body 4 approaches edge 18 of body 12. Also, aperture 16 is located in plate 15 so that when edges 17 and 14 and edges 6 and 18 abut each other, aperture 16 is in registry with open end 27 of opening 7 in stud 8.

As can be seen from FIG. 6, when threaded pin 40 is screwed into threaded interior opening 7 of stud 8, projection 41 on pin 40 passes through aperture 16 of plate 15 thereby physically locking body 4 to body 12 and, consequently, shaft 20 to shaft 30. This locking resists both longitudinal and rotational stresses applied to either or both of shafts 20 and 30.

Reasonable variations and modifications are possible within the scope of this disclosure without departing from the spirit and scope of this invention.

I claim:

1. A cold weather coupling device for quick joining of two shafts in an end-to-end abutting relation comprising a first coupling means adapted to be carried by a first shaft end and comprising a first hollow cylindrical body having an arcuate cut out portion of said first body removed from a part but not all of the length of said first body and from the outer end of said first body, said outer end being the end furthest removed from said first shaft, an aperture in said first cylindrical body opposite said cut out portion, a hollow, internally threaded stud means which is open at both ends and which has one end fixed to said first body in registry with said aperture in said first body and extending into the interior of said first body until it reaches said cut out portion, a second coupling means adapted to be carried by a second shaft end and comprising a second hollow cylindrical body having an arcuate cut out portion of said second body removed from a part but not all of the length of said second body and from the outer end of said second body, said outer end being the end furthest removed from said second shaft, said cut out portion of said second body being sized to mate with said cut out portion of said first body to provide a continuous cylindrical body extending from one shaft end to the other shaft end, a plate means extending across the cut out portion of said second body, said plate means having an aperture therein, said plate aperture being located in said plate so that when said first and second bodies are mated to form said continuous body said plate aperture is in registry with the interior open end of said stud means so that a threaded pin means can be screwed into said stud means from outside said first body and said pin means will extend through said stud means and into said plate aperture thereby physically joining said first and second bodies and said first and second shafts to one another.

2. The device according to claim 1 wherein said first and second cylindrical bodies are adapted to be carried by their respective first and second shaft ends part way into the interior of said shaft ends.

3. The device according to claim 1 wherein said first and second cylindrical bodies are carried by their respective first and second shaft ends on the outer end of said shafts as longitudinal extensions thereof.

* * * * *